(12) United States Patent
Bao (10) Patent No.: US 9,373,140 B2
(45) Date of Patent: Jun. 21, 2016

(54) GENERATION OF AN INTERFACE WITH COMPUTER-EXECUTABLE OPTIONS AND VISUAL ELEMENTS BASED ON COLLECTED SOCIAL NETWORK DATA

(71) Applicant: Verizon Patent and Licensing Inc., Basking Ridge, NJ (US)

(72) Inventor: Yulin Bao, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 320 days.

(21) Appl. No.: 13/689,113

(22) Filed: Nov. 29, 2012

(65) Prior Publication Data

US 2014/0149248 A1 May 29, 2014

(51) Int. Cl.
| | |
|---|---|
| G06Q 30/00 | (2012.01) |
| G06Q 30/06 | (2012.01) |
| G06Q 50/00 | (2012.01) |
| G06Q 30/02 | (2012.01) |

(52) U.S. Cl.
CPC ............ *G06Q 30/0631* (2013.01); *G06Q 50/01* (2013.01); *G06Q 30/02* (2013.01)

(58) Field of Classification Search
CPC ........... G06Q 30/0631–30/0643; G06Q 50/00; G06Q 50/01
See application file for complete search history.

(56) References Cited

U.S. PATENT DOCUMENTS

| | | | | |
|---|---|---|---|---|
| 7,386,485 | B1 * | 6/2008 | Mussman et al. | 705/14.1 |
| 8,713,104 | B1 * | 4/2014 | Berk et al. | 709/204 |
| 2007/0244750 | A1 * | 10/2007 | Grannan et al. | 705/14 |
| 2009/0012940 | A1 * | 1/2009 | Ives et al. | 707/3 |
| 2011/0282821 | A1 * | 11/2011 | Levy et al. | 706/47 |
| 2013/0346172 | A1 * | 12/2013 | Wu | 705/14.16 |
| 2014/0067624 | A1 * | 3/2014 | Babu | 705/27.2 |

OTHER PUBLICATIONS

ReferralWeb: Combining Social Networks and Collaborative Filtering. Henry Kautz, Bart Selman, and Mehul Shah. Communications of the ACM, vol. 40 No. 3, Mar. 1997.*

* cited by examiner

*Primary Examiner* — William Allen (57) ABSTRACT

A network device is configured to receive purchase information and receive, from a social networking server, information regarding a friend of the user. The network device is further configured to receive additional purchase information associated with the friend. The network device is further configured to generate, based on a result of comparing the purchase information and the additional purchase information, a recommendation, and send the recommendation to a user device associated with the user.

20 Claims, 6 Drawing Sheets

GENERATION OF AN INTERFACE WITH COMPUTER-EXECUTABLE OPTIONS AND VISUAL ELEMENTS BASED ON COLLECTED SOCIAL NETWORK DATA

BACKGROUND

A user may purchase one or more services from a network service provider. These services may include telephone services, cellular phone services, Internet services, television services, and/or other communication services. The user may have the option to upgrade one or more of the services (e.g., upgrade a television service to include a premium movie package) that the user has purchased to from the network service provider.

DETAILED DESCRIPTION OF PREFERRED EMBODIMENTS

The following detailed description refers to the accompanying drawings. The same reference numbers in different drawings may identify the same or similar elements.

Systems and/or methods described herein may permit a network device to send a recommendation to a user to upgrade products and/or services that the user has purchased from a network service provider based on the user's friend purchasing upgraded products and/or services from the network service provider. For example, a user may purchase a television service without a premium movie package while the friend of the user may purchase the television service with the premium movie package. The network device may determine that the friend is purchasing an upgraded television service and may send a recommendation to the user to upgrade to the premium movie package based on the friend having purchased to the premium movie package.

Figure 1:
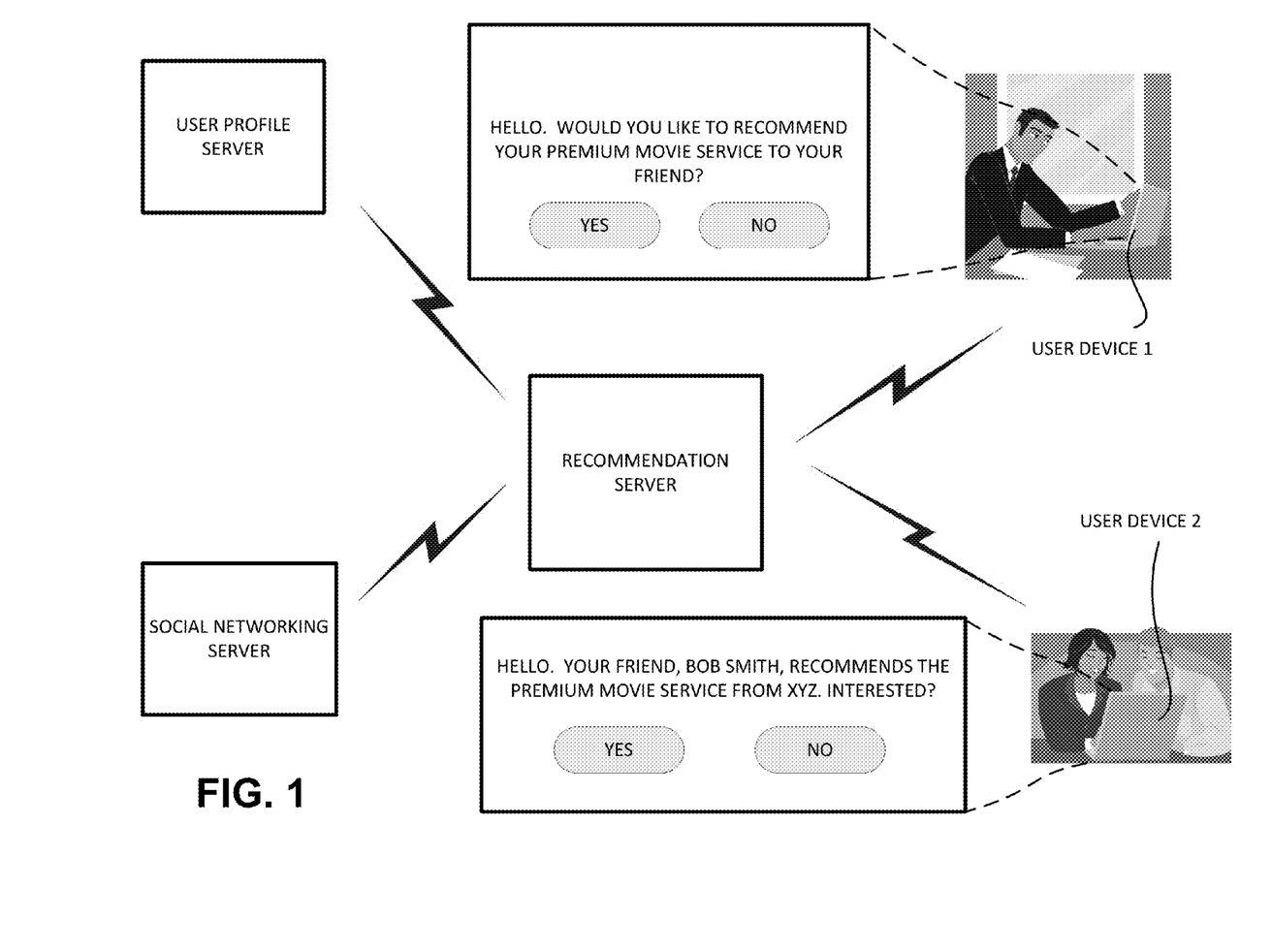
FIG. 1 is a diagram of an overview of an implementation described herein.

FIG. 1 is a diagram of an overview of an implementation described herein. FIG. 1 shows a user device 1, a user device 2, a user profile server, a social networking server, and a recommendation server. Assume that the user of user device 1 is logged into an account associated with a network service provider. Assume that the user is a customer for services from the network service provider and has purchased, rented, or leased (hereinafter generally referred to as "purchased") at least one product and/or service from the network service provider. Further, assume that the user profile server and the recommendation server are associated with the network service provider and that the social networking server is not associated with the network service provider. Further assume that the user has provided permission to permit the recommendation server to obtain information, associated with the user, from the user profile server, and the social networking server.

With the user, of user device 1, logged into the user's account, the user profile server may send a notification to the recommendation server. The recommendation server may obtain information about the user from the user profile server and the social networking server based on having permission to receive the information.

The recommendation server may obtain information about the user from the user profile server. This may include information about products and/or services that the user purchased from the network service provider. Assume that one of the services is a television service that includes a premium movie package.

The recommendation server may obtain information about the user from the social networking server. This may include information about the user's friends, such as the user's friends' names, addresses, the user's likes, the user's dislikes, and/or other information. The recommendation server may determine which of the user's friends also receive services from the network service provider. The recommendation server may request the user profile server to determine whether any of the user's friends have purchased products and/or service from the network service provider. Assume that the user profile server determines that one of the user's friends has purchased a television service without the premium movie package. The recommendation server may compare the services purchased by the user and the services purchased by the user's friends and determine whether the user or the friend has purchased an upgraded service. Based upon this determination, the recommendation server may determine that the user's friend has not purchased the premium movie package and that the user has purchased the premium movie package.

The recommendation server may send a message to user device 1. The message may, as shown in FIG. 1, request sending a recommendation to the user's friend regarding the premium movie package. Assume that the user agrees (by selecting the "YES" icon) to have the recommendation sent to the friend. The recommendation server may receive the confirmation from user device 1 and the recommendation server may send a message to user device 2. Assume that the friend (using user device 2) is logged into the friend's account with the network service provider. The friend may receive and view a message on the display screen of user device 2 regarding a recommendation to upgrade to the premium movie package. The user, of user device 2, may have the option to obtain more information about the premium movie service or may choose not to obtain information about the premium movie service.

As a result, a network service provider may be able to enhance the network service provider's revenue and profitability by marketing upgraded services (provided by the network service provider) to the user by using a trusted source, such as a friend of the user.

While the example in FIG. 1 is described in terms of the network device providing a recommendation for upgraded services, the network device may also recommend new services and/or products (e.g., movies, music, games, etc.) to the friend based on the user having purchased that service and/or product. For example, the user may have purchased a movie from the network service provider and the recommendation to the friend may recommend that the friend to purchase the movie based on the user having purchased the movie.

Figure 2:
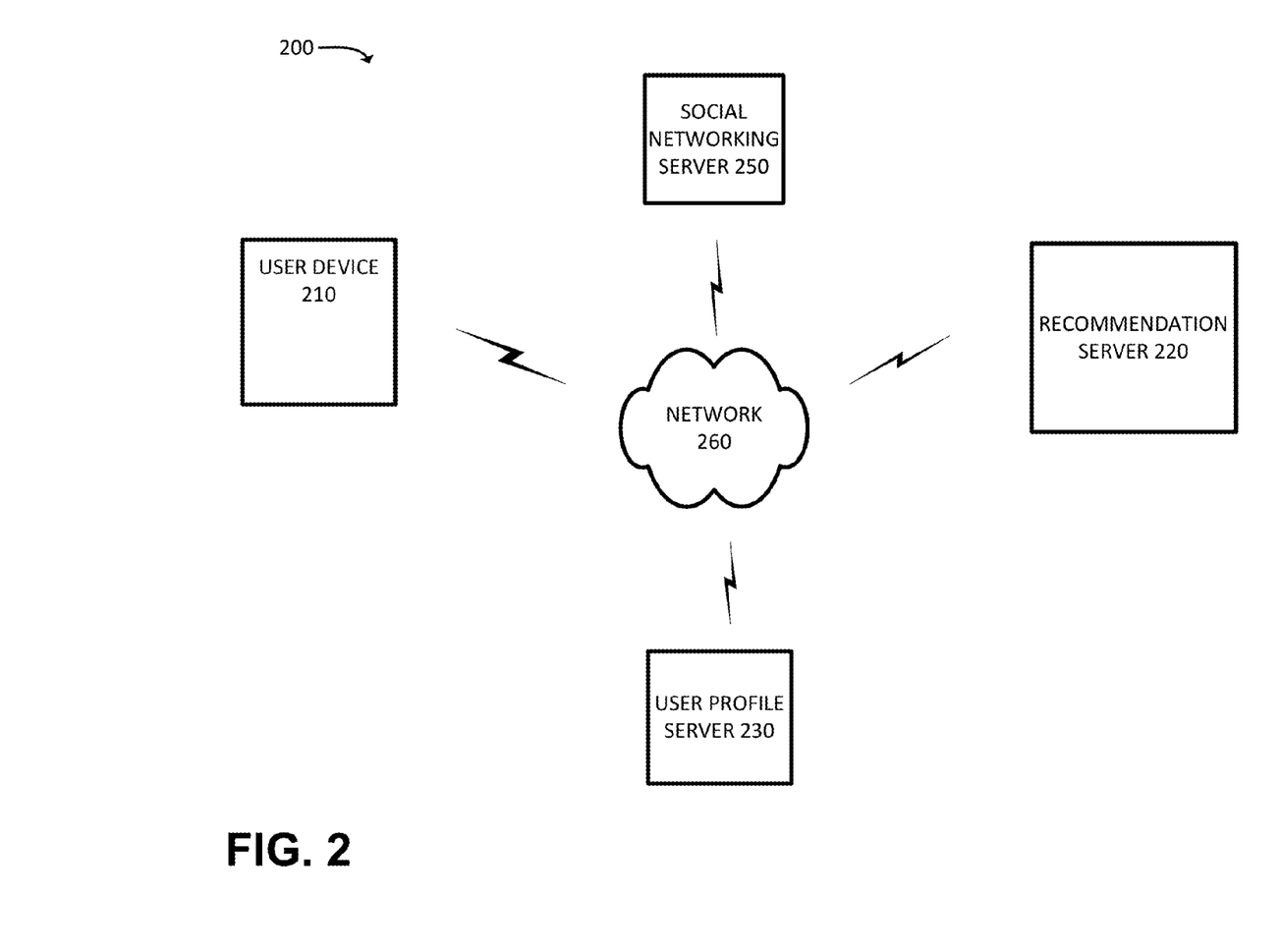
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a recommendation server 220, a user profile server 230, a social networking server 250, and a network 260.

User device 210 may include any user device that is capable of communicating with a network (e.g., network 260). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop, a tablet computer, a computer, or any other type of user device.

User device 210 may include a variety of applications such as, for example, a social networking application, a photo sharing application, an e-mail application, a telephone application, a video application, a multi-media application, a music player application, a visual voicemail application, a contacts application, a data organizer application, a calendar application, an instant messaging application, a texting application, a web browsing application, a blogging application, and/or other types of applications (e.g., a word processing application, a spreadsheet application, etc.).

Recommendation server 220 may include one or more network devices that determine a recommendation based on information from user profile server 230 and/or social networking server 250.

User profile server 230 may include one or more server devices that store user profile information. User profile information may include demographic information for a user, such as a user's age, gender, residential address, and/or other demographic information. User profile information may include information about services purchased by the user, such as television services, telephone services, wireless services, Internet services, and/or other types of services provided by a network service provider. User profile information may include information about products and/or services purchased by the user, such as digital video recorders, televisions, tablet computers, personal computers, set top boxes, smart phones, movies, music, sports channels, movie channels, and/or other types of products and/or services.

Social networking server 250 may include one or more network devices that provide a social networking application that may be used on user device 210. Social networking server 250 may provide and/or interface with a social networking application, such as Facebook, Foursquare, Loopt, and/or a service related to the social networking application. Social networking server 250 may provide a social networking application that can be used on user device 210 to communicate any media stream, such as a video stream, an audio stream, a textual stream, and/or any other type or form of content. Social networking server 250 may provide a social networking application that includes services, such as games, scripts, and/or messaging services that may be used on device 210.

Network 260 may include one or more wired and/or wireless networks. For example, network 260 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, a long term evolution network (LTE), and/or a combination of these or other types of networks.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
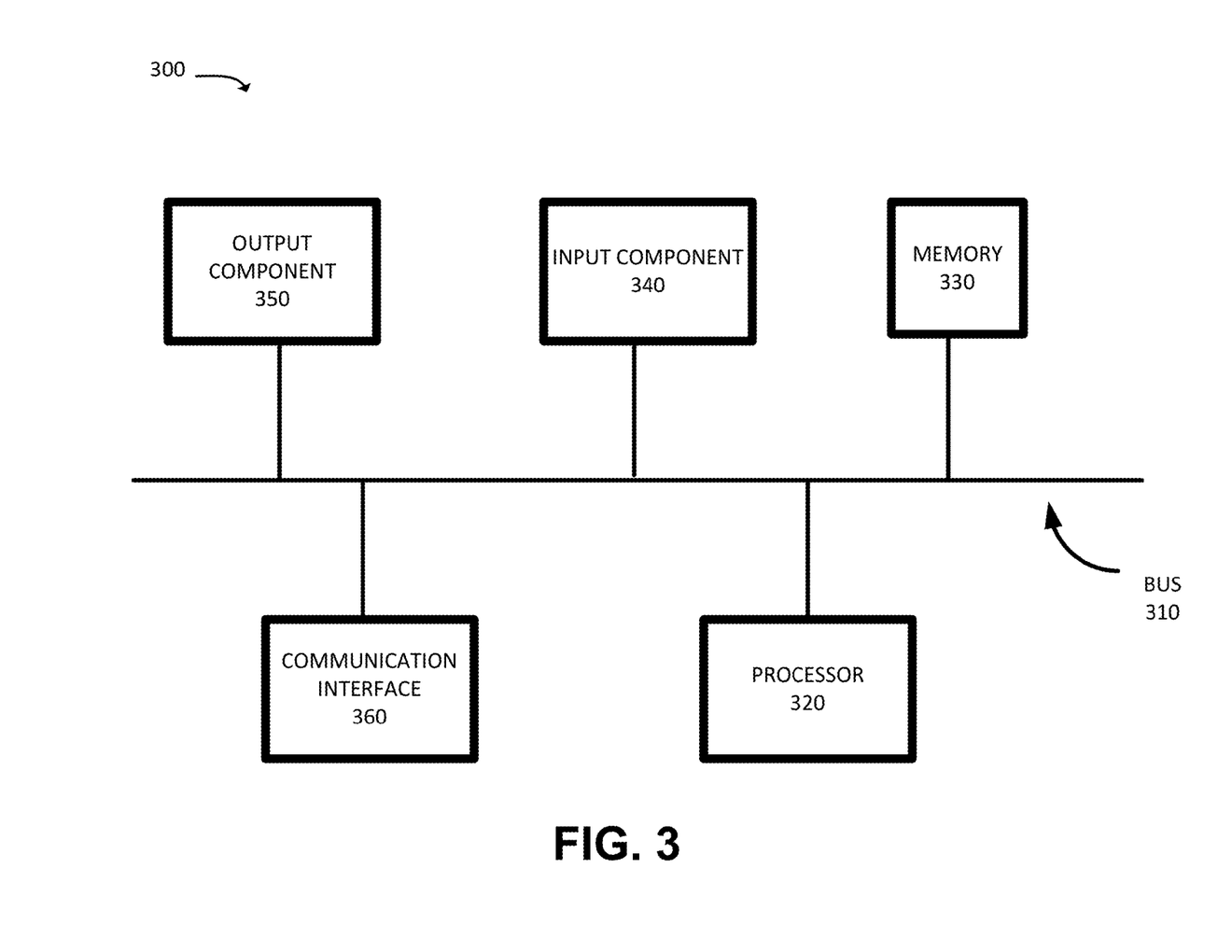
FIG. 3 is a diagram of example components of one or more devices of FIGS. 1 and 2.

FIG. 3 is a diagram of example components of a device 300. Device 300 may correspond to user device 210, recommendation server 220, user profile server 230, and/or social networking server 250. Additionally, or alternatively, each of user device 210, recommendation server 220, user profile server 230, and/or social networking server 250 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA), or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a component that permits a user to input information to device 300, such as a keyboard, a keypad, a button, a microphone, a switch, etc. Output component 350 may include a component that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with network 280 and/or devices connected to network 280.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include memory space within a single physical storage device or memory space spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
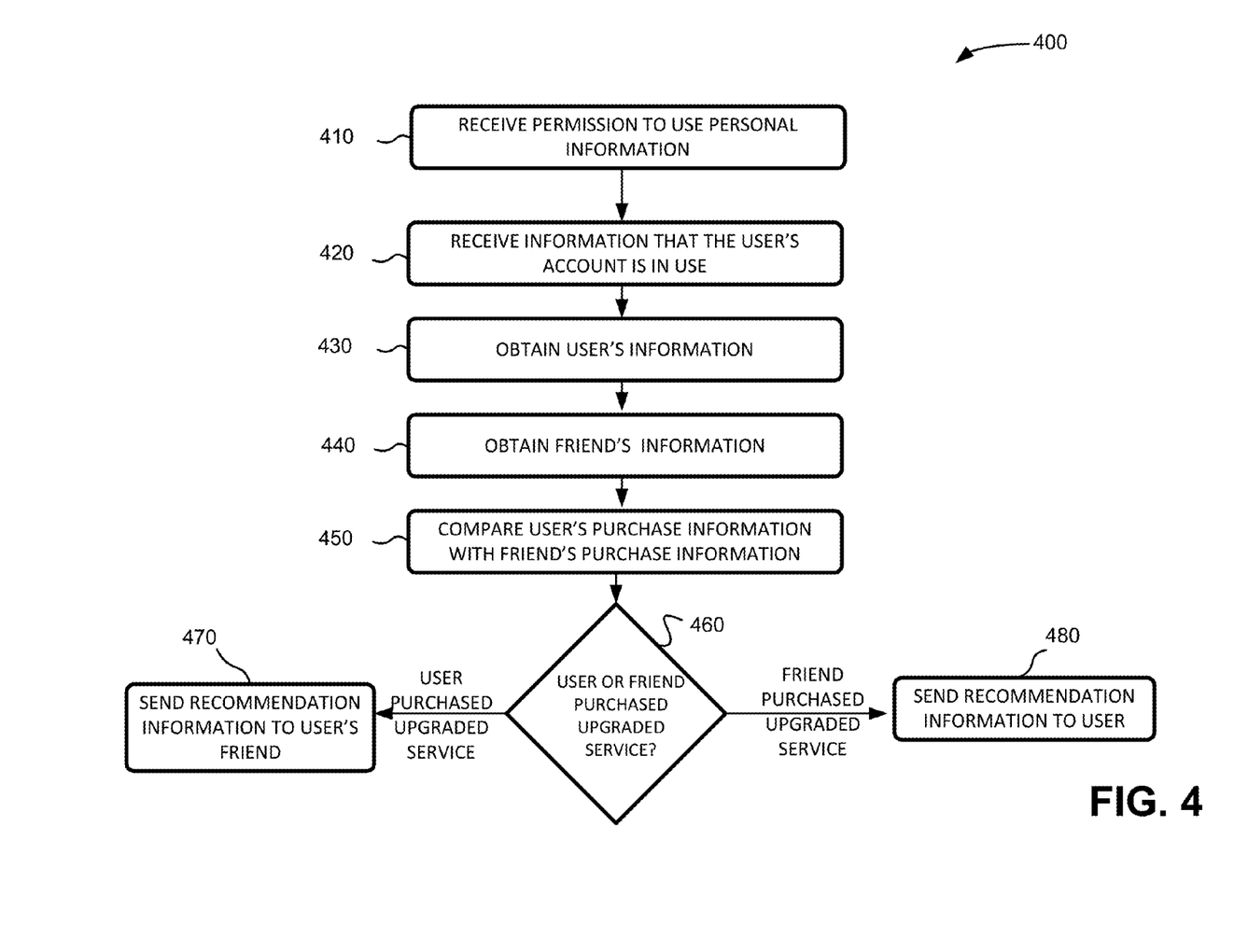
FIG. 4 is a flow chart of an example process for providing recommendations.

FIG. 4 is a flow chart of an example process 400 for providing recommendations. In one implementation, process 400 may be performed by recommendation server 220. In another example implementation, one or more blocks of process 400 may be performed by one or more other devices, such as user profile server 230.

In some implementations, recommendation server 220, user profile and server 230 may be associated with the same network service provider of services to a user of user device 210.

Process 400 may include receiving permission to use personal information (block 410). For example, recommendation server 220 may send a request to a user, of user device 210, requesting permission to use the user's personal information in making recommendations to the friends of the user. The request may be sent to user device 210 via the user's account (accessible via a web page), an email account, and/or any other type of account. Alternatively, recommendation server 220 may send a message to another user device 210 associated with an employee (e.g., a customer service representative) of the network service provider. The employee may view the message on the other user device 210. The message may instruct the employee to communicate (e.g., via telephone, email, instant messaging, etc.) with the user and request permission, from the user, to use the user's personal information in making recommendations to the friends of the user. The request may provide the user with options regarding what personal information may be used by recommendation server 220. In some implementations, the user may have the option to select information regarding which types of services may be used by recommendation server 220. For example, the user may permit recommendation server 220 to use information regarding one type of service (e.g., telephone service) purchased from a network service provider and the user may not permit recommendation server 220 to use information regarding another type of service (e.g., television service) purchased from the network service provider.

The user may have the option to select from which of the user's social networking applications recommendation server 220 may obtain information regarding the user and/or the user's friends. For example, the user may decide that recommendation server 220 may only obtain information from a first social networking application and not from a second social networking applications.

The user may have the option to select which of the user's friends may receive recommendation notifications from recommendation server 220. Alternatively, the user may have the option to select which of the user's friends (who receive service from the network service provider) may not receive notifications from recommendation server 220.

If the user provides permission to recommendation server 220 to use the personal information, the user may send a message (including any of the above options selected by the user), using user device 210, to recommendation server 220. Recommendation server 220 may store information relating to the permission provided by the user. Recommendation server 220 may send a request to user profile server 230 that user profile server 230 notify recommendation server 220 when the user's account (with the network service provider) is in use (e.g., the user is logged into the account and/or a customer representative (who works for the network service provider) is accessing the account) to determine whether to send a recommendation to the user.

At a later time, the user may, using user device 210, communicate with recommendation server 220 to change the information relating to the permission provided by the user (as described above). For example, the user may decide to stop recommendation server 220 from sending recommendations to the user's user device 210 and/or a friend's user device 210. The user may decide not to permit recommendation server 220 from obtaining information from the user's social networking account via social networking server 250. Additionally, or alternatively, the user may change which of the user's friend's may receive recommendations from recommendation server 220. Additionally, or alternatively, the user may change which types of products and/or services may be recommend to the user's friends by recommendation server 220. Recommendation server 220 may send a message to the user's user device 210 acknowledging the change to the information relating to the permission parameters.

Process 400 may include receiving information that the user's account is in use (block 420). For example, a user, of user device 210, may log into the user's account associated with the network service provider. The login information may include a user name and password, biometric information (fingerprint information), a unique code, and/or any other type of login information. The login information may be sent to user profile server 230, and/or another network device, which may validate the login information. User profile server 230 may store information (based on the user's permission to recommendation server 220 to receive the user's personal information, described with regard to block 410) to send a message to recommendation server 220 that the user is currently logged into the user's account with the network service provider.

Alternatively, an employee (e.g., a customer service representative) of the network service provider may be using another user device 210 to access account information associated with the user who may be communicating with the employee via telephone, instant messaging, email, and/or another communication method. The employee may be using a customer service application on the employee's user device 210 to request access to the user's account. The request to access the user's account may be sent from the employee's user device 210 to user profile server 230.

User profile server 230 may send a message to recommendation server 220 that an employee, of the network service provider, is currently accessing information from the user's account.

Process 400 may include obtaining the user's information (block 430). For example, recommendation server 220 may obtain information from user profile server 230 and social networking server 250.

From user profile server 230, recommendation server 220 may obtain information regarding the user. This may include information about the products and/or services that the user has purchased from the network service provider. Recommendation server 220 may only obtain the personal information permitted by the user as described in block 410. The products and/or services being used by the user may include television services (e.g., cable television service, satellite television service, digital television service, premium movie service, premium sports service, high definition television service, etc); telephone services (e.g., long distance service, international telephone service, voicemail service, etc.); Internet services (e.g., DSL service, fiber-optic service, etc.); hardware (e.g., digital video recorder, set top box, smart phone, etc.); and/or other types of products and/or services.

Based on receiving permission from the user (described with regard to block 410), recommendation server 220 may communicate with social networking server 250. From social networking server 250, recommendation server 220 may obtain personal information, such as a list of the user's friends, the user's interests (e.g., likes, dislikes, hobbies, etc.), the friends' interests (e.g., likes, dislikes, hobbies, etc.), and/or other personal information.

In one example implementation, recommendation server 220 may have an agreement with the provider of social networking server 250 that permits recommendation server 220 to communicate with social networking server 250 via an application programming interface (API) to receive personal information associated with the user's social networking account (associated with social networking server 250). For example, recommendation server 220 may receive a list of the user's friends from the user's social networking account.

In another example implementation, recommendation server 220 may receive the user's login information for a social networking account (associated with social networking server 250) when the user provides recommendation server 220 permission (described with regard to block 410) to use personal information from the social networking account. Recommendation server 220 may log into the user's social networking account and may obtain personal information from the user's social networking account.

Process 400 may include obtaining the friend's information (block 440). For example, recommendation server 220 may obtain information about which of the user's friends are customers of the network service provider. Recommendation server 220 may receive a list of the user's friends from the social networking account. Recommendation server 220 may send a query to user profile server 230 to determine whether each of these friends is a customer of the network service provider. If the user's friend is a customer of the network service provider, then user profile server 230 may send purchase information about the user' friend, such as the products and/or services that the user's friend has purchased from the network service provider (e.g., the user's friend has purchased a basic cable television service from the network service provider). If the user's friend is not a customer of the network service provider, then user profile server 230 may send a message to recommendation server 220 that the user's friend is not a customer of the network service provider.

Process 400 may include comparing the user's purchase information with the friend's purchase information (block 450). For example, recommendation server 220 may make a recommendation by using the purchase information (described with regard to block 440) regarding the products and/or services purchased by the user, and using purchase information (described with regard to block 440) regarding the products and/or services purchased by the user's friends . . . .

Recommendation server 220 may use the purchase information to determine which products and/or services purchased by the user are upgraded services in comparison to services purchased by the user's friends, and vice versa. Recommendation server 220 may determine, based on information, accessible by recommendation server 220, whether a product or service is an upgraded product or service in comparison to other products and/or services.

Additionally, recommendation server 220 may use the purchase information to determine which products and/or services purchased by the user are not purchased by the user's friend, or vice versa. For example, the user may have purchased a television service and a telephone service and the friend may have purchased only a television service. Recommendation server 220 may determine that the recommendation may include making a recommendation to the friend to purchase the television service purchased by the user. Alternatively, for example, the user may have purchased a particular on-demand movie and the friend has not purchased that particular on-demand movie. Recommendation server 220 may determine that the recommendation may include making a recommendation to the friend to purchase the movie.

If the user purchased upgraded services (block 460—user purchased upgraded service), then process 400 may include sending recommendation information to the user's friend (block 470). For example, recommendation server 220 may send a message to user device 210 that recommendation server 220 would like to send a recommendation for upgraded services to a friend of the user. The user may have the option to permit recommendation server 220 to send the recommendation to the user's friend. If the user selects to permit recommendation server 220 to send the recommendation to the user's friend, then recommendation server 220 may receive a message from user device 210 and may send a recommendation message to the friend's user device 210. The friend's user device 210 may receive the recommendation message via the friend's account with the network service provider, an email account, or another type of account. Alternatively, recommendation server 220 may send the recommendation message to the friend's social networking account using the user's social networking account (based on recommendation server 220's access to the user's social networking account).

The friend may view the recommendation message on the friend's user device 210 and may have an option to obtain more information about the recommendation. For example, the recommendation message may be "Hi, your friend, Bob Smith has purchased an upgraded telephone service, are you interested in upgrading your telephone service?" If the friend is interested, the friend's user device 210 may send a message to recommendation server 220 that the friend is interested in upgrading the friend's service. Recommendation server 220 may receive the message and send the recommendation to the friend. The recommendation may provide the friend with additional information about the user's current upgraded service, such as prices, terms of agreement and/or other information. If the friend is not interested, the friend's user device 210 may send a message to recommendation server 220 that the friend is not interested in upgrading the friend's service.

Alternatively, recommendation server 220 may send a message to the customer service representative's user device 210. The customer service representative may communicate with the user (e.g., via telephone, email, instant messaging, etc.) whether a recommendation may be sent to the user's friend. The user may notify the customer service representative whether to give permission for recommendation server 220 to communicate with the user's friend via the friend's user device 210. If the user provides permission, the customer service representative may select, on the customer service representative's user device 210, a selection that the user has provided permitted a recommendation to be sent to the user's friend.

Upon making the selection, the customer service representative's user device 210 sends a message to recommendation server 220. Recommendation server 220 may send a recommendation message to the friend's user device 210. The recommendation message may include information that the user recommends to the friend a product and/or service purchased by the user. The friend may view the recommendation on the friend's user device 210. The friend may select an option to obtain more information about the recommendation which results in another message being sent to recommendation server 220. Recommendation server 220 may receive the other message and send additional information about the upgraded product and/or service to the friend's user device 210.

In some example implementations, recommendation server 220 may send recommendations to the user that include a recommendation to purchase a product and/or service not currently purchased by the user's friend, based on the user having purchased that product and/or service.

If the friend purchased upgraded services (block 460— friend purchased upgraded service), then process 400 may include sending recommendation information to the user (block 480). For example, recommendation server 220 may send a message to the user's user device 210 that includes a recommendation to the user, based on the friend's upgraded service from the network service provider. For example, the message may notify the user that a friend of the user purchased a premium sports package and ask the user whether the user would like to purchase the premium sports package. The user may select an option to obtain more information about the recommendation which results in a message being sent to recommendation server 220. Recommendation server 220 may receive the message and send additional information (e.g., price, terms and conditions, etc.) regarding the upgraded product and/or service being purchased by the friend to the user's user device 210.

Alternatively, recommendation server 220 may send a message to the customer service representative's user device 210. The customer service representative may communicate, with the user (e.g., via telephone, email, instant messaging, etc.) regarding a recommendation for upgraded services based on the products and/or services purchased by the friend from the network service provider. The user may choose to receive additional information about the upgraded product or service. If the user chooses to receive additional information, the customer service representative's user device 210 may send a request for information regarding the upgrade to recommendation server 220. Recommendation server 220 may receive the request and may send the additional information regarding the upgrade to the customer service representative's user device 210 and/or the user's user device 210.

In some example implementations, recommendation server 220 may send recommendations to the user that include a recommendation to purchase a product and/or service not already purchased by the user, based on the user's friend having purchased that product and/or service.

While a series of blocks has been described with regard to FIG. 4, the blocks and/or the order of the blocks may be modified in other implementations. Further, non-dependent blocks may be performed in parallel.

Figure 5A:
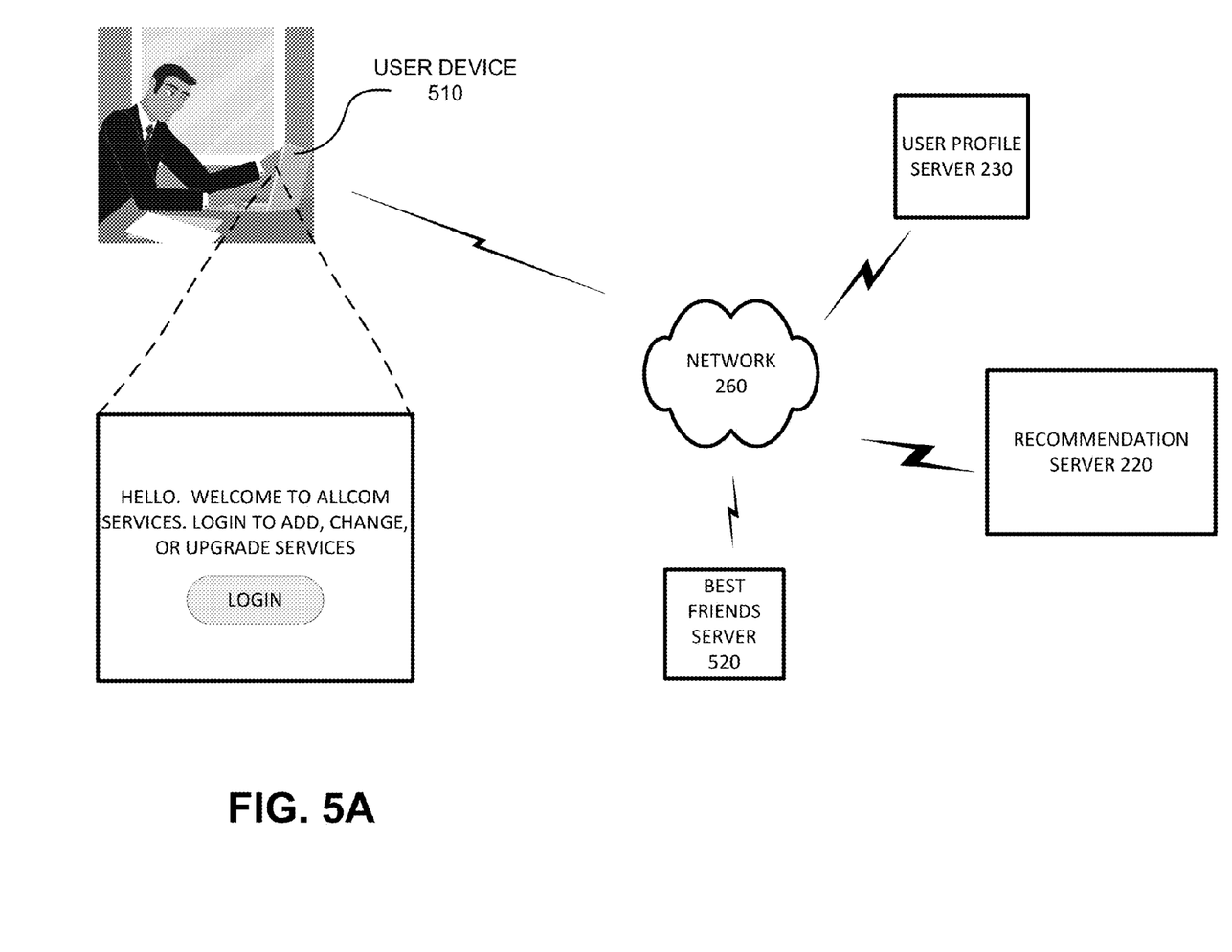
FIGS. 5A-5B are diagrams of an example process for providing a recommendation.
Figure 5B:
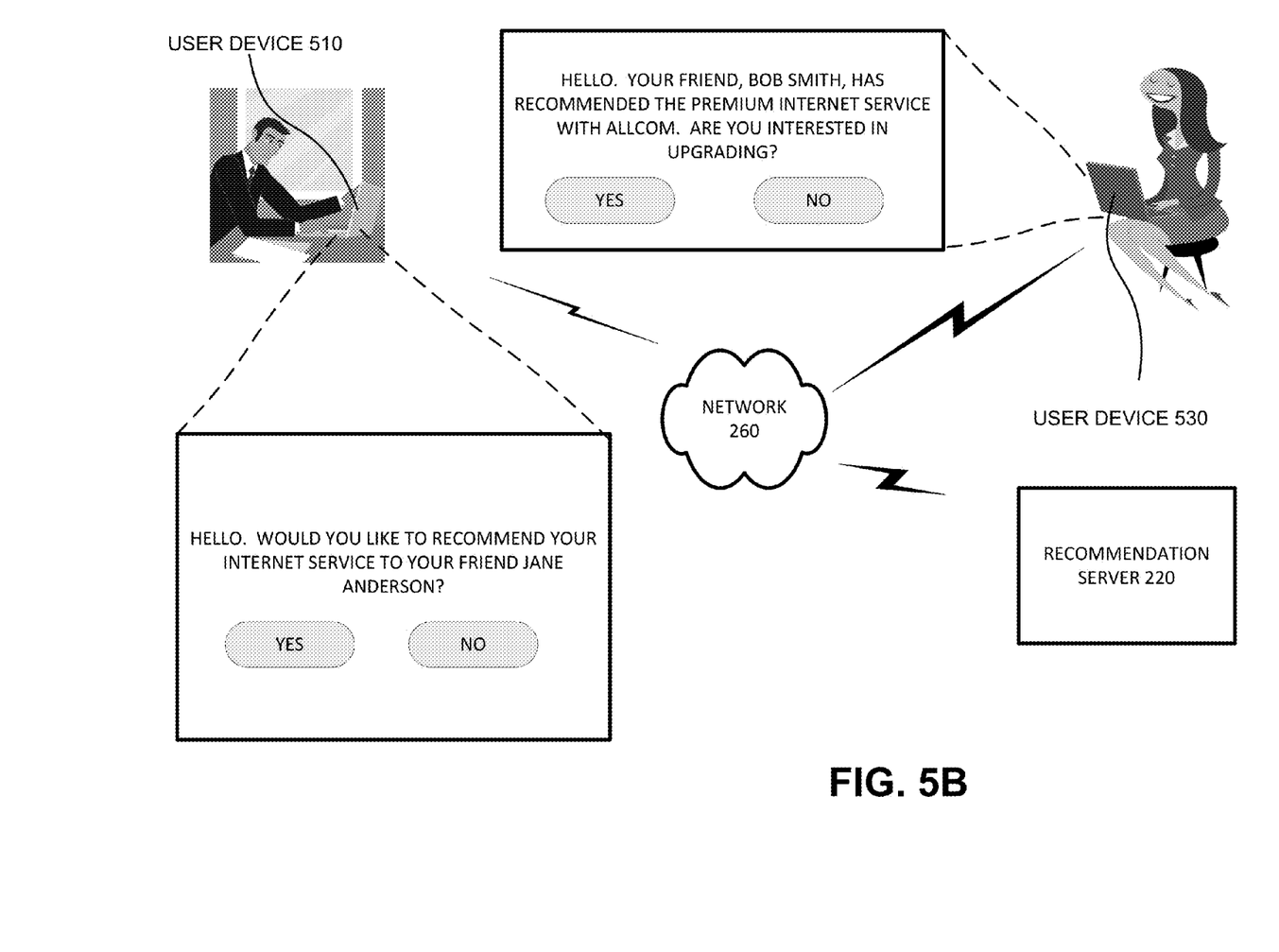

FIGS. 5A-5B are diagrams of an example process for providing a recommendation. FIG. 5A shows user device 510, recommendation server 220, user profile server 230, network 260, and Best Friends server 520. Best Friends server 520 may correspond to social networking server 250, described with regard to FIG. 2. FIG. 5B shows network 260, user device 510, and user device 530. User device 510 and user device 530 may each correspond to user device 210, described with regard to FIG. 2.

Bob Smith is using user device 510. Assume that Bob has logged into his ALLCOM account and that Bob has permitted recommendation server 220 to receive information from his ALLCOM account. Assume that ALLCOM provides television, Internet, and telephone services. Assume that user profile server 230 stores information that indicates that Bob has permitted recommendation server 220 to use Bob's personal information. User profile server 230 may send a message to recommendation server 220 that Bob is currently logged into his ALLCOM account. Recommendation server 220 may send a request to user profile server 230 to send recommendation server 220 Bob's personal information regarding products/services purchased by Bob. Assume that recommendation server 220 receives Bob's personal information from user profile server 230 that Bob has purchased a premium television package and a premium Internet service from ALLCOM.

Recommendation server 220 may also obtain personal information identifying Bob's friends from Best Friends Server 520. Assume that Bob has provided recommendation server 220 permission to log into Bob's social networking account with Best Friends server 520. Recommendation server 220 may log into Bob's social networking account to receive a list of Bob's friends from Best Friends server 520. Assume that Bob has two friends, Jane Anderson and Stan Jones, associated with his Best Friends social networking account. Recommendation server 220 may send a request to user profile server 230 requesting information about Jane and Stan. Assume that user profile server 230 sends a message, based on receiving the request, to recommendation server 220 that Stan is not a customer of ALLCOM and that Jane is a customer of ALLCOM.

Recommendation server 220 may request user profile server 230 to provide information about what products and/or services Jane has purchased from ALLCOM. User profile server 230 may send information, regarding the products and/or services that Jane has purchased from ALLCOM, to recommendation server 220. Assume that Jane has purchased a premium television package and a standard Internet service from ALLCOM.

Recommendation server 220 may compare the services purchased by Bob to the services purchased by Jane and may determine that Bob purchased an upgraded Internet service relative to the standard Internet service purchased by Jane. Recommendation server 220 may determine that a recommendation can be made to Jane to upgrade the standard Internet service to the premium Internet service based on Bob's purchase of the premium Internet service.

As shown in FIG. 5B, recommendation server 220 may send a message to user device 510. Bob may view the message, on user device 510, requesting whether Bob would permit a recommendation for the premium Internet service to be sent to his friend Jane. Bob may determine that he would like the recommendation to be sent to Jane. Bob selects the "YES" option. Upon selecting the "YES" option, user device 510 notifies recommendation server 220 via network 260. Recommendation server 220 may receive the notification from user device 510 and recommendation server 220 may send a message to user device 530. Assume that Jane is logged into her ALLCOM account. Jane may view the message from recommendation server 220 on her ALLCOM account, via user device 530. The message may indicate to Jane that Bob has recommended the premium Internet service from ALLCOM. Jane decides that she would like to upgrade her Internet service and is interested in obtaining additional information about the premium Internet service. Jane selects the "YES" option.

Upon selecting the "YES" option, user device 530 notifies recommendation server 220 via network 260. Recommendation server 220 may receive the notification from user device 530 and may send information about the premium Internet service, purchased by Bob, to Jane.

Systems and/or methods described herein may permit a network device to send a recommendation to a user to upgrade products and/or services that the user has purchased from a network service provider based on the user's friend purchasing upgraded products and/or services from the network service provider. As a result, the network service provider may increase the network service provider's profitability by up-selling existing customers with upgraded services based on personal recommendations from the customer's friends.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A network device comprising:
   one or more processors to:
   receive purchase information,
      the purchase information including information regarding a service or product purchased by a user;
   communicate with a social networking server via an application programming interface,
   collect, from the social networking server and via the application programming interface, data indicating interactions of the user with a social networking application associated with the social networking server,
   identify information within the data regarding a friend of the user configured via the social networking application;
   receive additional purchase information associated with the friend,
      the additional purchase information including information regarding a different service or product purchased by the friend;
   determine which of the service or product purchased by the user or the different service or product purchased by the friend is an upgraded service or product,
   generate, when the different service or product purchased by the friend is determined to be the upgraded service or product, first interface information for outputting a first interface on a user device associated with the user,
      the first interface including a computer-executable option to upgrade to the different service or product via a network service provider server and a first visual element based on the data collected from the social networking server;
   send, to the user device and when the different service or product purchased by the friend is determined to be the upgraded service or product, the first interface information for outputting the first interface on the user device a;
   generate, when the service or product purchased by the user is determined to be the upgraded service or product, second interface information for outputting a second interface on the user device,
      the second interface including a computer-executable option to grant permission to send recommendation information to a second user device associated with the friend and a second visual element based on the data collected from the social networking server; and
   send, to the user device and when the service or product purchased by the user is determined to be the upgraded service or product, the second interface information for outputting the second interface on the user device.

2. The network device of claim 1, where the first interface includes information recommending the user to upgrade the service or product based on the friend purchasing the different service or product.

3. The network device of claim 1,
   where the recommendation information includes information recommending that the friend upgrade the different service or product based on the service or product being an upgrade of the different service or product.

4. The network device of claim 3, where the one or more processors are further to:
receive a message from the user device not to send the recommendation information to the second user device.

5. The network device of claim 3, where the one or more processors further to:
receive a message from the user device, and via the second interface, to send the recommendation information to the second user device;
send the recommendation information to the second user device;
receive, from the second user device, a request for additional information regarding the recommendation information; and
send the additional information to the second user device based on receiving the request.

6. The network device of claim 5, where, when sending the recommendation information to the second user device, the one or more processors are further to:
send the recommendation information to the social networking server for presentation via the social networking application downloaded on the second user device.

7. The network device of claim 1, where, when sending the first interface information, the one or more processors are further to:
send the first interface information to the social networking server for presentation via the social networking application downloaded on the user device.

8. A method comprising:
receiving, by a network device, purchase information,
the purchase information including information regarding a service or product purchased by a user;
communicating, by the network device and via an application programming interface, with a social networking server;
collecting, by the network device and from the social networking server via the application programming interface, data indicating interactions of the user with a social networking application associated with the social networking server;
identifying, by the network device, information within the data regarding a friend of the user configured via the social networking application;
receiving, by the network device, additional purchase information associated with the friend,
the additional purchase information including information regarding a different service or product purchased by the friend;
determining, by the network device, which of the service or product purchased by the user or the different service or product purchased by the friend is an upgraded service or product;
generating, by the network device and when the different service or product purchased by the friend is determined to be the upgraded service or product, first interface information for outputting a first interface on a user device associated with the user,
the first interface including a computer-executable option to upgrade to the different service or product via a network service provider server and a first visual element based on the data collected from the social networking server;
sending, by the network device and when the different service or product purchased by the friend is determined to be the upgraded service or product, the first interface information to the user device to be output;
generating, by the network device and when the service or product purchased by the user is determined to be the upgraded service or product, second interface information for outputting a second interface on the user device,
the second interface including a computer-executable option to grant permission to send recommendation information to a second user device associated with the friend and a second visual element based on the data collected from the social networking server; and
sending, by the network device and when the service or product purchased by the user is determined to be the upgraded service or product, the second interface information to the user device to be output.

9. The method of claim 8,
where the method further comprises:
receiving, based on sending the first interface information to the user device, a request message from the user device to receive additional information regarding upgrading the service or product.

10. The method of claim 8,
where the method further comprises:
receiving, based on sending the first interface information to the user device, a denial message from the user device not to send additional information regarding upgrading the service or product.

11. The method of claim 8, where sending the second interface information to the user device includes:
sending the second interface information to the social networking server for presentation via the social networking application downloaded on the user device.

12. The method of claim 8,
where the method further comprises:
receiving a notification from the user device to send the recommendation information to the second user device; and
sending a message to the second user device.

13. The method of claim 12, where sending the message to the second user device includes:
accessing, via the application programming interface, a social network account associated with the user; and
sending, based on accessing the social network account associated with the user, the message to the social networking server to be sent from the social network account associated with the user to a social network account associated with the friend for presentation, via the social networking application, to the second user device.

14. A non-transitory computer-readable medium comprising:
a plurality of instructions that, when executed by one or more processors of a network device, cause the one or more processors to:
receive purchase information,
the purchase information including information regarding a service or product purchased by a user;
communicate with a social networking server via an application programming interface;
collect, from the social networking server and via the application programming interface, data indicating interactions of the user with a social networking application associated with the social networking server;
identify information within the data identifying a friend of the user, the information, identifying the friend, corresponding to information in a social networking account associated with the user;
receive additional purchase information associated with the friend,
the additional purchase information including information regarding a different service or product purchased by the friend;
determine which of the service or product purchased by the user or the different service or product purchased by the friend is an upgraded service or product,
generate, when the different service or product purchased by the friend is determined to be the upgraded service or product, first interface information for outputting a first interface on a user device associated with the user,
the first interface including a computer-executable option to upgrade to the different service or product via a network service provider server and a first visual element based on the data collected from the social networking server;
send, to the user device and when the different service or product purchased by the friend is determined to be the upgraded service or product, the first interface information for outputting the first interface on the user device;
generate, when the service or product purchased by the user is determined to be the upgraded service or product, second interface information for outputting a second interface on the user device,
the second interface including a computer-executable option to grant permission to send recommendation information to a second user device associated with the friend and a second visual element based on the data collected from the social networking server; and
send, to the second user device and when the service or product purchased by the user is determined to be the upgraded service or product, the second interface information for outputting the second interface on the user device.

15. The non-transitory computer-readable medium of claim 14, further comprising:
one or more instructions that, when executed by the one or more processors, cause the one or more processors to:
receive a message from the user device to send the recommendation information to the second user device;
send a notification, including information regarding the recommendation information, to the second user device based on receiving the message; and
receive a request from the second user device for additional information regarding the recommendation information based on sending the notification.

16. The non-transitory computer-readable medium of claim 14, further comprising:
one or more instructions that, when executed by the one or more processors, cause the one or more processors to:
receive a message from the user device that the network device is not permitted to receive the information from the social networking server; and
send an acknowledgment to the user device that the network device is not permitted to receive the information from the social networking server.

17. The non-transitory computer-readable medium of claim 14, further comprising:
one or more instructions that, when executed by the one or more processors, cause the one or more processors to:
receive a message from the user device not to send the first interface information to the user device; and
send an acknowledgment to the user device that the first interface information is not be sent to the user device.

18. The non-transitory computer-readable medium of claim 14, further comprising:
one or more instructions that, when executed by the one or more processors, cause the one or more processors to:
receive a message from the user device to send the first interface information to the user device for a particular type of service or product; and
send the first interface information to the user device for the particular type of service or product based on receiving the message.

19. The non-transitory computer-readable medium of claim 14, further comprising:
one or more instructions that, when executed by the one or more processors, cause the one or more processors to:
receive a message from the user device not to recommend a particular upgraded service or product to a second user device; and
send a notification to the second user device without recommending the particular upgraded service or product to the second user device based on receiving the message.

20. The non-transitory computer-readable medium of claim 14, where one or more instructions, of the plurality of instructions, to receive the information from the social networking server include one or more instructions to:
receive the information from the social networking server based on the network device using login information for the social networking account associated with the user.

* * * * *